US012808013B2

(12) United States Patent
Leunis et al.

(10) Patent No.: US 12,808,013 B2
(45) Date of Patent: Nov. 24, 2026

(54) DOUBLE COLD ROLLED NON-ORIENTED ELECTRICAL STEEL AND A METHOD OF MANUFACTURING NON-ORIENTED ELECTRICAL STEEL THEREOF

(71) Applicant: ArcelorMittal, Luxembourg (LU)

(72) Inventors: Elke Leunis, Ghent (BE); Sigrid Jacobs, Merelbeke (BE); Xavier Chassang, St Chély d'Apcher (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 19/289,141

(22) Filed: Aug. 4, 2025

(65) Prior Publication Data

US 2025/0361576 A1 Nov. 27, 2025

Related U.S. Application Data

(63) Continuation of application No. PCT/IB2024/061344, filed on Nov. 14, 2024.

(30) Foreign Application Priority Data

Nov. 15, 2023 (WO) .................. PCT/IB2023/061529

(51) Int. Cl.

| | |
|---|---|
| ***C21D 9/46*** | (2006.01) |
| ***B21B 3/02*** | (2006.01) |
| ***C21D 1/84*** | (2006.01) |
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/16*** | (2006.01) |
| ***H01F 1/147*** | (2006.01) |

(52) U.S. Cl.

CPC .................. *C21D 9/46* (2013.01); *B21B 3/02* (2013.01); *C21D 1/84* (2013.01); *C21D 6/005* (2013.01); *C21D 6/008* (2013.01); *C21D 8/1222* (2013.01); *C21D 8/1233* (2013.01); *C21D 8/1261* (2013.01); *C21D 8/1277* (2013.01); *C22C 38/004* (2013.01); *C22C 38/02* (2013.01); *C22C 38/04* (2013.01); *C22C 38/06* (2013.01); *C22C 38/16* (2013.01); *H01F 1/14791* (2013.01); *C21D 2211/005* (2013.01); *C22C 2202/02* (2013.01)

(58) Field of Classification Search

CPC . C21D 9/46; C21D 1/84; C21D 6/005; C21D 6/008; C21D 8/1222; C21D 8/1233; C21D 8/1261; C21D 8/1277; C21D 2211/005; B21B 3/02; C22C 38/004; C22C 38/02; C22C 38/04; C22C 38/06; C22C 38/16; C22C 2202/02; H01F 1/14791

See application file for complete search history.

(56) References Cited

U.S. PATENT DOCUMENTS

| | | | |
|---|---|---|---|
| 2008/0260569 A1 | 10/2008 | Bae et al. | |
| 2013/0125601 A1 | 5/2013 | Kubota et al. | |
| 2013/0167987 A1 | 7/2013 | Kim et al. | |
| 2013/0309525 A1 | 11/2013 | Fujikura et al. | |
| 2014/0238558 A1 | 8/2014 | Fujikara et al. | |
| 2018/0119258 A1 | 5/2018 | Fujikura et al. | |
| 2019/0345576 A1 | 11/2019 | Park et al. | |
| 2020/0087748 A1 | 3/2020 | Lee et al. | |
| 2021/0159002 A1 | 5/2021 | Okubo et al. | |
| 2021/0371948 A1 | 12/2021 | Zaizen et al. | |
| 2023/0045797 A1* | 2/2023 | Lee | C22C 38/12 |
| 2024/0035131 A1 | 2/2024 | Natori et al. | |

(Continued)

FOREIGN PATENT DOCUMENTS

| | | |
|---|---|---|
| CN | 103498096 A | 1/2014 |
| CN | 105256227 A | 1/2016 |

(Continued)

OTHER PUBLICATIONS

Bertotti et al. "General Properties of Power Losses in Soft Ferromagnetic Materials"; published in IEEE Transactions on Magnetics, vol. 24, No. 1 of Jan. 1988.

(Continued)

*Primary Examiner* — Rebecca Janssen

(74) *Attorney, Agent, or Firm* — Davidson Kappel LLC

(57) ABSTRACT

A double cold rolled non-oriented electrical steel sheet having a composition including, expressed in percentage by weight: 0.0001%≤Carbon≤0.007%, 0.15%≤Manganese≤0.3%, 3.2%≤Silicon≤3.8%, 0.8%≤Aluminum≤1.1%, Phosphorus≤0.15%, Sulfur≤0.006%, Nitrogen≤0.09%, and can contain various optional elements. The remainder composition being iron and unavoidable impurities caused by processing, the microstructure is made of ferrite and has in area fraction, 80% to 100% recrystallized microstructure, 0% to 20% non-recrystallized microstructure wherein the average grain size of recrystallized microstructure is from 20 microns to 110 microns and having a percentage of eddy current losses in total iron losses, measured at 1 T and 400 Hz according to IEC 60404-2 standards, less than 30% when calculated in accordance of Bertotti method and simultaneously having a magnetic polarization at 5000 A/m (J50) from 1.66 T to 1.69 T.

15 Claims, No Drawings

(56) References Cited

U.S. PATENT DOCUMENTS

| | | | | |
|---|---|---|---|---|
| 2024/0038422 | A1* | 2/2024 | Lee | C22C 38/001 |
| 2024/0417830 | A1 | 12/2024 | Yue et al. | |
| 2025/0188557 | A1 | 6/2025 | Yue et al. | |
| 2025/0283189 | A1 | 9/2025 | Kim et al. | |
| 2025/0340963 | A1* | 11/2025 | Jacobs | C21D 8/1272 |

FOREIGN PATENT DOCUMENTS

| | | | |
|---|---|---|---|
| CN | 105950960 | A | 9/2016 |
| CN | 111206192 | A | 5/2020 |
| CN | 111471941 | A | 7/2020 |
| CN | 113897549 | A | 1/2022 |
| CN | 115198198 | A | 10/2022 |
| CN | 115198199 | A | 10/2022 |
| CN | 115341083 | A | 11/2022 |
| CN | 116288011 | A | 6/2023 |
| EP | 2657357 | A2 | 10/2013 |
| EP | 3173503 | A1 | 5/2017 |
| EP | 3209807 | B1 | 11/2020 |
| EP | 3741874 | A1 | 11/2020 |
| EP | 4079893 | A2 | 10/2022 |
| EP | 4265744 | A1 | 10/2023 |
| EP | 4265745 | A1 | 10/2023 |
| EP | 4265749 | A1 | 10/2023 |
| JP | H0559441 | A | 3/1993 |
| JP | 2008127612 | A | 6/2008 |
| JP | 2012036458 | A | 2/2012 |
| JP | 2013091837 | A | 5/2013 |
| JP | 2017119897 | A | 7/2017 |
| KR | 20030053146 | A | 6/2003 |
| KR | 20130076546 | A | 7/2013 |
| KR | 20130127294 | A | 11/2013 |
| KR | 20140058937 | A | 5/2014 |
| KR | 20160061797 | A | 6/2016 |
| KR | 101701195 | B1 | 2/2017 |
| WO | WO9308313 | A1 | 4/1993 |
| WO | WO02052048 | A1 | 7/2002 |
| WO | WO2019132317 | A1 | 7/2019 |
| WO | WO2022210890 | | 10/2022 |
| WO | WO2023070982 | A1 | 5/2023 |
| WO | WO2025104640 | A1 | 2/2025 |
| WO | WO 2025/104651 | A1 | 5/2025 |
| WO | WO2025104469 | A1 | 5/2025 |
| WO | WO2025104470 | A1 | 5/2025 |
| WO | WO2025104641 | A1 | 5/2025 |
| WO | WO2025104643 | A1 | 5/2025 |
| WO | WO2025104644 | A1 | 5/2025 |
| WO | WO2025104645 | A1 | 5/2025 |
| WO | WO2025104646 | A1 | 5/2025 |
| WO | WO2025104647 | A1 | 5/2025 |
| WO | WO2025104648 | A1 | 5/2025 |
| WO | WO2025104649 | A1 | 5/2025 |
| WO | WO2025104650 | A1 | 5/2025 |
| WO | WO2025104654 | A1 | 5/2025 |
| WO | WO2025104655 | A1 | 5/2025 |
| WO | WO2025104657 | A1 | 5/2025 |
| WO | WO2025104658 | A1 | 5/2025 |

OTHER PUBLICATIONS

See International Search Report of PCT/IB2024/061344, dated Feb. 21, 2025.

* cited by examiner

DOUBLE COLD ROLLED NON-ORIENTED ELECTRICAL STEEL AND A METHOD OF MANUFACTURING NON-ORIENTED ELECTRICAL STEEL THEREOF

This is a continuation of International Patent Application PCT/IB2024/061344, published as WO 2025/104649 A1, filed on Nov. 14, 2024 which claims priority to PCT/IB2023/061529, filed on Nov. 15, 2023. All of which are hereby incorporated by reference herein.

The present invention relates to a double cold rolled non-oriented electrical steel sheet and a manufacturing method thereof. Specifically, the present invention relates to a double cold rolled non-oriented electrical steel sheet and a manufacturing method thereof that have low iron losses specifically a low eddy current loss while having good mechanical properties.

BACKGROUND

Intense research and development endeavors to achieve higher performance properties have been required for a non-oriented electrical steel sheet to be used as an iron core material of an electrical machine, seeking a worldwide increase in achievement of energy saving of an electrical apparatus. Recently in particular, as a motor to be used for an electric vehicle or the like, a demand for a small-sized high-power motor has been high. Such an electric vehicle motor has been designed to make high-speed rotation possible to thereby obtain high torque while having lowest possible losses. This requires light and highly efficient non oriented electrical steels which have low losses as their key property.

SUMMARY OF THE INVENTION

Finding the balance between losses, permeability, polarization, thermal conductivity, tensile strength and yield strength, is vital for non-oriented electrical steels.

The lower the iron losses in the electric machine, the higher its efficiency, hence to reduce the quantity of the iron losses in an electrical machine the manufacturers of the electrical machines have several options, whereby their principal options are to reduce either the hysteresis losses or the eddy current losses to improve the efficiency of their electrical machine. Advances are frequently achieved by a combination of the two approaches. This invention relates to the second option, namely the reduction of eddy current losses for an electrical machine. There are two track alternatives to reduce the eddy current losses:

The first track consists of reducing the thicknesses of the steel sheets used in the electrical machines such as to have the thickness of the steel sheet below 0.35 mm or even lower. Unfortunately, this solution has its limits on account of a reduction in the stacking factor which decreases the torque achievable for a given machine height and further a prohibitive decrease in the rigidity of certain automotive parts and the appearance of acoustical problems that create uncomfortable conditions for the passenger.

The second track consists of optimizing the elemental composition of the steel sheet such as by increase the amount of alloying elements to restrict the eddy current losses. Among these alloying elements Aluminum and Manganese are ones that have attractive mechanical and magnetic properties while making it possible to significantly reduce the eddy current losses. However, addition of alloying elements only can be done up to a limit because after a certain percentage presence alloying elements will impacts the hysteresis losses and the magnetic polarization.

Earlier research and developments in the field of high strength non-oriented electrical steel have resulted in several methods for producing high strength non-oriented electrical steel, some of which are enumerated herein for conclusive appreciation of the present invention:

US2021/0371948 is non-oriented electrical steel sheet with an average magnetostriction λp–p at 400 Hz and 1.0 T of not more than $4.5\times10^{-6}$, and area ratio of recrystallized grains at a section in rolling direction of steel sheet of 40 to 95% and an average grain size of 10 to 40 microns is obtained by subjecting a steel slab containing, in mass %, C: not more than 0.005%, Si: 2.8 to 6.5%, Mn: 0.05 to 2.0%, Al: not more than 3.0%, P: not more than 0.20%, S: not more than 0.005%, N: not more than 0.005%, Ti: not more than 0.003%, V: not more than 0.005% and Nb: not more than 0.005% and satisfying Si-2A1-Mn≥0 to hot rolling, hot-band annealing, cold rolling and finish annealing under adequate cold rolling and finish annealing conditions, and a motor core is manufactured by such a steel sheet. US2021/0371948 does not demonstrate the total elongation and eddy current loss at all.

It is an object of the present invention to solve these problems by making a double cold rolled non-oriented electrical steel sheets that simultaneously have a magnetic polarization at 5000 A/m (J50) from 1.66 T to 1.69 T and preferably a magnetic polarization at 5000 A/m (J50) from 1.66 T to 1.68 T and more preferably a magnetic polarization at 5000 A/m (J50) from 1.664 T to 1.675 T and a percentage of eddy current loss in total iron loss of less than 30%, and preferably from 25% to 30% and more preferably from 27% to 30% when calculated in accordance with Bertotti method.

In preferred embodiments, the additional following properties can be also reached, alone or in combination:

- an ultimate tensile strength of 500 MPa or more in both transversal direction as well as rolling direction and preferably more than 530 MPa in both transversal direction as well as rolling direction
- a yield strength from 390 MPa or more in both transversal direction as well as rolling direction and preferably from 410 MPa or more in both transversal direction as well as rolling direction
- a total elongation of 19% or more in both transversal direction as well as rolling direction and preferably more than or equal to 21% in both transversal direction as well as rolling direction
- a total loss from 11 to 14 W/kg when measured at 1 T and 400 Hz and preferably from 12 to 13 W/kg when measured at 1 T and 400 Hz Preferably, such steel can also have a good suitability for rolling with good punchability and coatability.

Preferably, a hardness greater than or equal to 185 HV and preferably hardness greater than or equal to 195 HV.

The present invention provides double cold rolled non-oriented electrical steel sheet having a thickness from 0.23 mm to 0.26 mm and a composition comprising of the following elements, expressed in percentage by weight:

$$0.0001\% \leq \text{Carbon} \leq 0.007\%$$

$$0.15\% \leq \text{Manganese} \leq 0.3\%$$

$$3.2\% \leq \text{Silicon} \leq 3.8\%$$

$$0.8\% \leq \text{Aluminum} \leq 1.1\%$$

-continued

Phosphorus ≤ 0.15%

Sulfur ≤ 0.006%

Nitrogen ≤ 0.09%

0.01% ≤ Copper ≤ 1% and can contain one or more of the following optional elements

0% ≤ Niobium ≤ 0.1%

0% ≤ Titanium ≤ 0.1%

0% ≤ Vanadium ≤ 0.1%

0% ≤ Chromium ≤ 1%

0% ≤ Molybdenum ≤ 0.5%

0% ≤ Tungsten ≤ 0.1%

0% ≤ Cobalt ≤ 1%

0% ≤ Arsenic ≤ 0.05%

0.001% ≤ Calcium ≤ 0.01%

0.001% ≤ Nickel ≤ 0.04%

0% ≤ Boron ≤ 0.05%

0% ≤ Lead ≤ 0.2%

0% ≤ Tin ≤ 0.2%

0% ≤ Antimony ≤ 0.2% the remainder composition being composed of iron and unavoidable impurities caused by processing, the microstructure of said steel sheet being made of ferrite and comprising in area fraction, 80% to 100% recrystallized microstructure, 0% to 20% non-recrystallized microstructure wherein the average grain size of recrystallized microstructure is from 20 microns to 110 microns and having a percentage of eddy current losses in total iron losses, measured at 1 T and 400 Hz according to IEC 60404-2 standards, less than 30% when calculated in accordance of Bertotti method and simultaneously having a magnetic polarization at 5000 A/m (J50) from 1.66 T to 1.69 T.

The present invention also provides a method of production of a double cold rolled non-oriented electrical steel sheet as described above comprising the following successive steps:

providing a steel composition described above;

reheating said semi-finished product to a temperature from 1050° C. to 1250° C.;

rolling the said semi-finished product wherein the hot rolling finishing temperature shall be from 840° C. to 950° C. to obtain a hot rolled steel sheet.

cooling the hot rolled sheet immediately after the finishing of hot rolling then the hot rolled steel sheet is cooled from finishing of hot rolling to a coiling temperature range which is from 500° C. to 560° C. at a cooling rate of at least 10° C./s thereafter coiling the hot rolled steel sheet in the coiling temperature range from 500° C. to 560° C.

optionally performing scale removal process on said hot rolled steel sheet;

optionally hot band annealing is performed on hot rolled steel sheet from 780° C. to 1000° C. during 10 seconds to 96 hours;

optionally performing scale removal process on said hot rolled steel sheet;

cold rolling the said hot rolled steel sheet with a reduction rate from 60% to 95% to obtain an intermediatory cold rolled steel sheet;

thereafter subjecting the said intermediatory cold rolled steel sheet to first annealing wherein the heating for first annealing starts from room temperature to a to first annealing temperature range TA1 which is from 900° C. to 1080° C., with a heating rate HR1 of at least 1° C./s, then perform first annealing at TA1 temperature during 10 to 5000 seconds, then cooling the intermediatory cold rolled steel sheet which starts from the TA1 temperature to a temperature T1 from 300° C. to 20° C., with a cooling rate CR1 from 1° C./s to 150° C./s to obtain a first annealed cold rolled steel sheet thereafter the first annealed cold rolled steel sheet is subjected to cold rolling with a reduction rate from 50% to 95% to obtain a cold rolled steel sheet;

thereafter the said cold rolled steel sheet is subjected to second annealing wherein the heating for second annealing starts from room temperature to an annealing temperature range TA2 which is from 880° C. to 1050° C., with a heating rate HR2 of at least 1° C./s, then perform annealing at TA2 temperature during 10 to 5000 seconds, then cooling the cold rolled steel sheet which starts from the TA2 temperature to a temperature T2 from 300° C. to 20° C., with a cooling rate CR1 from 1° C./s to 150° C./s then cooling to room temperature to obtain a double cold rolled non-oriented electrical steel sheet.

Another object of the present invention is also to make available a method for the manufacturing of these sheets that is compatible with conventional industrial applications while being robust towards manufacturing parameters shifts.

DETAILED DESCRIPTION

The above object and other advantages of the present invention will become more apparent by describing in detail the preferred embodiment of the present invention.

The chemical composition of the non-oriented electrical steel comprises of the following elements, in weight percent:

Carbon is present in the steel of the present invention is from 0.0001% to 0.007%. Carbon is a precipitate forming element that is why detrimental for the magnetic properties of the present steel. Hence the presence of Carbon in the present steel is from 0.0001% to 0.007%. Since the Carbon promotes magnetic aging the preferred content of Carbon according to the present invention is from 0.002% to 0.007% and more preferably from 0.002% to 0.005%.

Manganese content of the steel of the present invention is from 0.15% to 0.3%. Manganese provides solid solution strengthening and reducing the iron loss by increasing specific resistance. When the addition of manganese amount is above 0.3%, the magnetic flux density may be considerably reduced, and recrystallization of the steel will be hindered during annealing. The preferred limit for the presence of Manganese is from 0.18% to 0.27% and more preferably 0.21% to 0.25%.

Silicon content of the steel of the present invention is from 3.2% to 3.8%. Silicon is an element that contributes to increasing the strength by solid solution strengthening and is a key element to reduce eddy current loss of iron loss by increasing specific resistance of steel. The mentioned effects requires a minimum Silicon content of at least 3.2%. However, when silicon content is in an amount exceeding 3.8% causes the rolling to be difficult and the magnetic induction of the steel will be significantly lowered. The preferred limit for the presence of Silicon is from 3.2% to 3.7% and more preferably from 3.2% to 3.5%.

The content of the Aluminum is from 0.8% to 1.1%. Aluminum increases the electrical resistivity of the material and can effectively reduce the iron loss of steel. When the content of Aluminum is present more than 1.1%, the magnetic induction of the steel will be significantly reduced, and it is also detrimental to the rollability of cold rolling of the steel of the present invention. The preferred limit for the presence of Aluminium is from 0.85% and 1% and more preferably from 0.85% to 0.95%.

Sulfur is not an essential element but may be contained as an impurity in steel and from point of view of the present invention the Sulfur content is preferably as low as possible but 0.006% or less from the viewpoint of manufacturing cost. Further if higher Sulfur is present in steel it combines to form Sulfides which are detrimental for the magnetic properties of the present invention.

Phosphorus constituent of the steel of the present invention is from 0% to 0.15%, Phosphorus reduces the hot and cold ductility, particularly due to its tendency to segregate at the grain boundaries or co-segregate with Manganese. For these reasons, its content is limited to 0.15% and preferably lower than 0.09%.

Nitrogen is limited to 0.09% to minimize the precipitation of Aluminum nitrides during solidification which are detrimental for magnetic properties of the steel.

Titanium is an optional element and when added to the steel of the present invention is from 0% to 0.1%. It forms Titanium-nitrides appearing during solidification of the cast product. The amount of Titanium is so limited to 0.1% to avoid the formation of Titanium-nitrides detrimental for magnetic properties of the steel of the present invention. In case the Titanium content below 0.001% does not impart any effect on the steel of the present invention.

Niobium is present in the steel of the present invention from 0% to 0.1% and suitable for forming carbo-nitrides to increase strength of the steel of the present invention by precipitation hardening. Niobium will also impact the size of microstructural components through its precipitation as carbo-nitrides. However, Niobium content above 0.1% is not economically interesting as a saturation effect.

Vanadium is present in the steel of the present invention from 0% to 0.1% and is effective in enhancing the strength of steel by forming carbides or carbo-nitrides and the upper limit is 0.1% from economic points of view.

Chromium is an optional element for the steel of the present invention is from 0% to 1%. Chromium provide strength to the steel by solid solution strengthening but when used above 1% impairs the magnetic properties of the steel.

Molybdenum is an optional element that constitutes 0% to 0.5% of the steel of the present invention.

Mo has an effect of coarsening carbide and thus reducing the iron loss. When it exceeds 0.5%, the effect of improving the iron loss is saturated.

Tungsten is an optional element that constitutes 0% to 0.1% of the steel of the present invention. Tungsten has an effect of coarsening carbide and reducing the iron loss, like Mo. However, when the addition amount is less than 0.001 mass %, the above effect cannot be obtained sufficiently, while when it exceeds 0.1 wt. %, the effect of improving the iron loss is saturated.

Cobalt is an optional element that constitutes 0% to 1% of the steel of the present invention. Cobalt is an element increasing the magnetic moment of Fe alloy and has an effect of increasing a magnetic flux density and reducing the iron loss. However, when the addition amount is less than 0.01 wt. %, the above effects cannot be obtained sufficiently, while when it exceeds 1 wt. %, the raw material cost is largely increased.

Arsenic is an optional element that constitutes 0% to 0.05% of the steel of the present invention. As is a grain boundary segregation element and has an effect of improving the texture and thus reducing the iron loss. The above effect is obtained by the addition of not less than 0.001 wt. %. However, As is an element causing grain boundary embrittlement, and this adverse effect becomes particularly remarkable when it is added by more than 0.05 wt. %. Therefore, As is preferable to be added within the range of 0.001 to 0.05 wt. %

Nickel is an optional element and is present in an amount of 0.001% to 0.01% to increase the strength of the steel of the present invention and to improve its strength and elongation. In a preferred embodiment, nickel content remains below 0.04%.

Copper may be added as an optional element in an amount of 0% to 1% to increase the strength and elongation of the steel of the present invention. However, when its content is above 1%, it can degrade the surface aspects. In a preferred embodiment, copper content is at least 0.01%.

Boron is an optional element for the steel of the present invention and may be present from 0% antod 0.05%. Boron forms boro-nitirides and impart additional strength to steel of the present invention when added in an amount of at least 0.0001%.

Calcium may be present in the steel of the present invention optionally and may be from 0.001% to 0.01% %. Calcium contributes towards the refining of the Steel by binding the detrimental Sulfur content in globular form thereby retarding the harmful effect of Sulfur.

Other elements such as Sn, Pb or Sb can be added individually or in combination in the following proportions: Sn≤0.2%, Pb≤0.2% and Sb≤0.2%. Up to the maximum content levels indicated, these elements make it possible to refine the grain during solidification. In a preferred embodiment, Sn content is below 0.04%.

The remainder of the composition of the steel consists of iron and inevitable impurities resulting from processing.

The microstructure of the non-oriented electrical steel will now be described in detail, all percentages being in area fraction.

The microstructure is made of ferrite. The steel of the present invention has a recrystallized microstructural region from 80% to 100% in area fraction with grains having an average grain size from 20 microns to 110 microns. The recrystallized structure with a high degree of recrystallization is due to the homogenous Silicon enrichment which improves magnetic properties of the steel of the present invention. A controlled grain size ensures the mechanical properties in both transverse and rolling direction. The preferred degree of recrystallization is from 90% to 100%. The preferred an average grain size for the present invention is from 20 microns to 100 microns and more preferably from 20 microns to 90 microns.

The steel of the present invention may have a non-recrystallized microstructural region from 0% to 20% in area fraction and the preferred degree of non-recrystallization is from 0% to 10% and more preferably from 0% to 5%.

In addition to the above-mentioned microstructure, the microstructure of the non-oriented electrical steel is free from microstructural components such as martensite, bainite, pearlite and cementite.

The steel according to the invention can be manufactured by any suitable methods. It is however preferable to use the method according to the invention that will be detailed, as a non-limitative example.

Such preferred method consists in providing a semi-finished casting of steel with a chemical composition of the steel according to the invention. The casting can be done either into ingots or continuously in form of thin slabs or thin strips, i.e. with a thickness ranging from approximately 240 mm or less for any form of casting.

For example, the cast in form of a slab is casted with the chemical composition according to the invention and then it is reheated, the Slab Reheating Temperature lying from 1050° C. to 1200° C. until the temperature is homogeneous through the whole slab. Below 1050° C., rolling becomes difficult and forces on the mill will be too high. Above 1200° C., high silicon grades become very soft and might show some sagging and thus become difficult to handle. Preferably, the slab reheating temperature is from 1080° C. to 1180° C. and more preferably from 1080° C. to 1150° C.

Subjecting the reheated slab to hot rolling wherein the hot rolling finishing temperature plays a role on the final hot rolled microstructure and takes place from 840° C. to 950° C. When the Finishing Rolling Temperature is below 840° C., recrystallization is limited and the microstructure is highly deformed. Above 950° C. would mean more impurities in solid solution and possible consequent precipitation and deterioration of magnetic properties as well. Preferably, the Finishing Rolling Temperature is from 840° C. to 940° C. and more preferably from 850° C. to 900° C.

The hot rolled steel sheet obtained in this manner is then cooled immediately at a cooling rate of at least 10° C./s to the Coiling Temperature of the hot rolled steel sheet which also plays a role on the hot rolled steel sheet; it takes place from 500° C. to 560° C. Coiling at temperatures below 500° C. will not have the proper distribution and size of the precipitates for the steel of the present invention. Above 560° C., a thick oxide layer would appear, and it will cause difficulties for subsequent processing steps such as cold rolling and/or pickling. Preferably, the cooling rate will be less than or equal to 200° C./s and more preferably the cooling rate is from 12° C./s to 75° C./s. Preferably, the Coiling Temperature is from 510° C. to 560° C. and more preferably from 520° C. to 555° C.

The coiled hot rolled steel sheet is then cooled down to room temperature before subjecting it to optional hot band annealing.

The hot rolled steel sheet may be subjected to an optional scale removal step to remove the scale formed during the hot rolling before optional hot band annealing. The hot rolled sheet then be subjected to an optional hot band annealing such hot band annealing is performed at temperatures from 780° C. to 1000° C., preferably for at least 10 seconds and not more than 96 hours, the temperature preferably remaining from 790° C. to 980° C. and more preferably from 800° C. to 950° C. Thereafter, an optional scale removal step of this hot rolled steel sheet may be performed through, for example, pickling of such sheet.

Thus, the hot rolled steel sheet obtained may optionally have thickness from 0.8 mm to 3.5 mm and preferably from 0.9 mm to 3 mm and more preferably 1 mm to 2.8 mm.

This hot rolled steel sheet is then subjected to first cold rolling to obtain an intermediatory cold rolled steel sheet with a thickness reduction from 60 to 95%. Preferably, the thickness reduction from preferably from 65% to 95%, leading to leads to an intermediate thickness preferably below 1 mm.

Thereafter the intermediatory cold rolled steel sheet is being heat treated which will impart the steel of the present invention with requisite mechanical properties and microstructure.

The intermediatory cold rolled steel sheet is then subjected to first annealing wherein the heating starts from room temperature, intermediatory cold rolled steel sheet being heated, at a heating rate HR1 of at least 1° C./s, to first annealing temperature TA1 which is from 900° C. to 1080° C., preferably from 950° C. to 1070° C. and more preferably from 990° C. to 1050° C. In a preferred embodiment, the heating rate HR1 for heating is at least 2° C./s and more preferably at least 5° C./s. The intermediatory cold rolled steel sheet is held at TA1 during 10 seconds to 5000 seconds to serves both to recrystallize the intermediatory cold rolled steel at a recrystallization from 80% to 100% after the first cold rolling as well as improves the magnetic properties of the steel of the present invention by dissolving the carbides precipitated during the sheet cooling and coiling after the hot rolling.

The intermediatory cold rolled steel sheet is then cooled wherein cooling starts from TA1, the intermediatory cold rolled steel sheet being cooled down, at a cooling rate CR1 from 1° C./s to 150° C./s, to a temperature T1 which is in a range from 20° C. to 300° C. In a preferred embodiment, the cooling rate CR1 is from 3° C./s to 120° C./s. The preferred T1 temperature is from 20° C. to 200° C. At the end of cooling a first annealed cold rolled steel sheet is obtained.

Thereafter, the first annealed cold rolled steel sheet is subjected to second cold rolling to obtain a cold rolled steel sheet with a thickness reduction from 50 to 95%. Preferably, the thickness reduction from 60% to 95% and more preferably from 75% to 95%.

Thereafter the cold rolled steel sheet is then subjected to a second annealing wherein the heating starts from room temperature, the cold rolled steel sheet being heated, at a heating rate HR2 of at least 1° C./s, to a second annealing temperature TA2 which is from 880° C. to 1050° C., preferably from 900° C. to 1020° C. and more preferably from 930° C. to 990° C. In a preferred embodiment, the heating rate HR2 for heating is at least 2° C./s and more preferably at least 5° C./s.

The cold rolled steel sheet is held at TA2 during 10 seconds to 5000 seconds to ensure a recrystallization from 80% to 100%.

The cold rolled steel sheet is then cooled wherein cooling starts from TA2, the cold rolled steel sheet being cooled down, at a cooling rate CR2 from 1° C./s to 150° C./s, to a temperature T2 which is in a range from 20° C. to 300° C. In a preferred embodiment, the cooling rate CR2 is from 3° C./s to 120° C./s. The preferred T2 temperature is from 20° C. to 100° C.

The cold rolled steel sheet thus obtained has a thickness from 0.23 mm to 0.26 mm and preferably from 0.23 mm to 0.25 mm and more preferably from 0.24 mm to 0.25 mm.

Then, the cold rolled steel sheet is cooled down to room temperature to obtain a double cold rolled non-oriented electrical steel sheet.

The double cold rolled non-oriented electrical steel sheet of the present invention may optionally be coated with insulation, organic coating or inorganic coating or combination of to improve isolation.

EXAMPLES

The following tests, examples, figurative exemplification and tables which are presented herein are non-restricting in nature and must be considered for purposes of illustration only and will display the advantageous features of the present invention.

Steel sheets made of steels with different compositions are gathered in Table 1, where the steel sheets are produced according to process parameters as stipulated in Table 2, respectively. Thereafter, table 3 gathers the result of evaluations of obtained properties.

All steels of Table 1 had a nitrogen content below 0.09%.

Table 2 gathers the hot rolling and annealing process parameters implemented on cold rolled steel sheets to impart the steels of table 1 with requisite mechanical and magnetic properties to become a non-oriented electrical steel. All the Inventive steels that is from 11 to 14 are cooled after hot rolling at cooling rate of 15° C./s. Further for the inventive examples the heating rate HR1 to the TA1 temperature is 5° C./s. The T1 temperature for all the inventive examples is 25° C. while the cooling rate CR1 is at 5° C./s and for all the inventive examples the heating rate HR2 to the TA2 temperature is 5° C./s. The T2 temperature for all the inventive examples is 25° C. while the cooling rate CR2 is at 5° C./s.

All steels produced according to table 2 parameters showed a recrystallized microstructure with more than 95% of recrystallization and with a grain size from 20 to 110 μm.

TABLE 1

| Steel | C | Mn | S | Al | P | S | Cu |
|---|---|---|---|---|---|---|---|
| I1 | 0.0035 | 0.234 | 3.25 | 0.89 | 0.014 | 0.0011 | 0.021 |
| I2 | 0.0035 | 0.235 | 3.26 | 0.90 | 0.014 | 0.0011 | 0.020 |
| I3 | 0.0036 | 0.231 | 3.30 | 0.93 | 0.013 | 0.0008 | 0.021 |
| I4 | 0.0036 | 0.230 | 3.31 | 093 | 0.013 | 0.0008 | 0.022 |

TABLE 2

| Trials | Reheating (° C.) | FRT (° C.) | Coiling (° C.) | HBA (° C.) | HBA time(hours) | First GR Reduction (%) | TA1 (° C.) | TA1 soaking time(s) | Second CR Reduction (%) | TA2 (° C.) | TA2 soaking time(s) | Cold rolled Thickness(mm) |
|---|---|---|---|---|---|---|---|---|---|---|---|---|
| I1 | 1091 | 864 | 552 | 800 | 12 | 66 | 1020 | 26 | 88 | 988 | 40 | 0.242 |
| I2 | 1091 | 864 | 552 | 800 | 12 | 66 | 1020 | 26 | 88 | 980 | 40 | 0.246 |
| I3 | 1133 | 868 | 548 | 800 | 12 | 67 | 1040 | 26 | 88 | 980 | 34 | 0.245 |
| I4 | 1133 | 868 | 548 | 800 | 12 | 67 | 1040 | 26 | 88 | 980 | 40 | 0.245 |

Table 3

The results of the various mechanical tests conducted in accordance with the standards are gathered. The ultimate tensile strength, total elongation and yield strength are measured in accordance with NF EN ISO 6892-1 standards and the J50 magnetic properties and the total iron losses at 1 T and 400 Hz were measured in accordance with IEC 60404-2 standards. The Eddy current losses are calculated in accordance with the Bertotti Method published in the paper entitled as "General Properties of Power Losses in Soft Ferromagnetic Materials" by Giorgio Berttoti published in IEEE TRANSACTIONS ON MAGNETICS, Vol. 24, No. 1 of January 1988. The Equation 2 identifies classical losses which is designated by ($P^{class}$) which for the purpose of this invention is referred to as Eddy current losses.

The average grain size of the recrystallized microstructure is measured in accordance with ASTM E112 96(02) standards with linear intercept method.

| Trials | Tensile Strength (MPa) RD | Tensile Strength (MPa) TD | Yield Strength (MPa) RD | Yield Strength (MPa) TD | Total Elongation (%) RD | Total Elongation (%) TD | J50 (T) | P1T/400 Hz (W/Kg) | % of Eddy current losses |
|---|---|---|---|---|---|---|---|---|---|
| I1 | 539 | 552 | 419 | 431 | 23.40 | 26.60 | 1.665 | 12.2 | 27.7 |
| I2 | 550 | 560 | 427 | 431 | 22.10 | 21.00 | 1.674 | 12.4 | 28.3 |

-continued

| Trials | Tensile Strength (MPa) | | Yield Strength (MPa) | | Total Elongation (%) | | J50 | P1T/400 Hz | % of Eddy current |
|---|---|---|---|---|---|---|---|---|---|
| | RD | TD | RD | TD | RD | TD | (T) | (W/Kg) | losses |
| I3 | 534 | 547 | 414 | 426 | 23.10 | 25.00 | 1.671 | 1.3 | 27.8 |
| I4 | 538 | 554 | 417 | 432 | 21.10 | 24.80 | 1.667 | 12.2 | 28.0 |

What is claimed is:

1. A double cold rolled non-oriented electrical steel sheet having a thickness from 0.23 mm to 0.26 mm and a composition comprising the following elements, expressed in percentage by weight:

0.0001% ≤ Carbon ≤ 0.007%

0.15% ≤ Manganese ≤ 0.3%

3.2% ≤ Silicon ≤ 3.8%

0.8% ≤ Aluminum ≤ 1.1%

0% ≤ Phosphorus ≤ 0.15%

0% ≤ Sulfur ≤ 0.006%

0% ≤ Nitrogen ≤ 0.09%

0.01% ≤ Copper ≤ 1% and optionally one or more of the following optional elements

0% ≤ Niobium ≤ 0.1%

0% ≤ Titanium ≤ 0.1%

0% ≤ Vanadium ≤ 0.1%

0% ≤ Chromium ≤ 1%

0% ≤ Molybdenum ≤ 0.5%

0% ≤ Tungsten ≤ 0.1%

0% ≤ Cobalt ≤ 1%

0% ≤ Arsenic ≤ 0.05

0.001% ≤ Calcium ≤ 0.01%

0.001% ≤ Nickel ≤ 0.04%

0% ≤ Boron ≤ 0.05%

0% ≤ Lead ≤ 0.2%

0% ≤ Tin ≤ 0.2%

0% ≤ Antimony ≤ 0.2% a remainder of the composition being composed of iron and unavoidable impurities caused by processing, a microstructure of the steel sheet being made of ferrite and comprising in area fraction, 80% to 100% recrystallized microstructure, 0% to 20% non-recrystallized microstructure, an average grain size of the recrystallized microstructure being from 20 microns to 110 microns and having a percentage of eddy current losses in total iron losses, measured at 1 T and 400 Hz according to IEC 60404-2 standards, less than 30% when calculated in accordance of Bertotti method and simultaneously having a magnetic polarization at 5000 A/m (J50) from 1.66 T to 1.69 T, wherein the steel sheet has an ultimate tensile strength of at least 500 MPa in both a transverse direction as well as a rolling direction, a yield strength from 390 MPa or more in both a transverse direction as well as a rolling direction, and a total elongation of at least 19% in both a transverse direction as well as a rolling direction.

2. The double cold rolled non-oriented electrical steel sheet as recited in claim 1 wherein the composition includes 3.2% to 3.7% of Silicon, expressed in percentage by weight.

3. The double cold rolled non-oriented electrical steel sheet as recited in claim 1 wherein the composition includes 0.002% to 0.007% of Carbon, expressed in percentage by weight.

4. The double cold rolled non-oriented electrical steel sheet as recited in claim 1 wherein the composition includes 0.85% to 1% of Aluminum, expressed in percentage by weight.

5. The double cold rolled non-oriented electrical steel sheet as recited in claim 1 wherein the composition includes 0.18% to 0.27% of Manganese, expressed in percentage by weight.

6. The double cold rolled non-oriented electrical steel sheet as recited in claim 1 wherein the amount of the non-recrystallized microstructure is from 0% to 10% in area fraction.

7. The double cold rolled non-oriented electrical steel sheet as recited in claim 1 wherein the amount of the recrystallized microstructure is from 90% to 100% in area fraction.

8. A method of production of the double cold rolled non-oriented electrical steel sheet as recited in claim 1, the method comprising the following successive steps:

providing a semi-finished product with the composition;

reheating the semi-finished product to a temperature from 1050° C. to 1250° C.;

hot rolling the semi-finished product wherein a hot rolling finishing temperature is from 840° C. to 950° C. to obtain a hot rolled steel sheet;

cooling the hot rolled sheet immediately after finishing of the hot rolling, the hot rolled steel sheet being cooled from the finishing of the hot rolling to a coiling temperature range from 500° C. to 560° C. at a cooling rate of at least 10° C./s;

thereafter coiling the hot rolled steel sheet in a coiling temperature range from 500° C. to 560° C.;

optionally performing a scale removal process on the hot rolled steel sheet;

optionally hot band annealing the hot rolled steel sheet from 780° C. to 1000° C. for 10 seconds to 96 hours;

optionally performing a further scale removal process on the hot rolled steel sheet;

cold rolling the hot rolled steel sheet with a reduction rate from 60% to 95% to obtain an intermediatory cold rolled steel sheet;

thereafter subjecting the intermediatory cold rolled steel sheet to a first annealing wherein heating for the first annealing starts from room temperature to a first annealing temperature range TA1 from 900° C. to 1080° C., with a heating rate HR1 of at least 1° C./s and annealing at the TA1 temperature for 10 to 5000 seconds;

then cooling the intermediatory cold rolled steel sheet starting from the TA1 temperature to a temperature T1 from 300° C. to 20° C., with a cooling rate CR1 from 1° C./s to 150° C./s to obtain a first annealed cold rolled steel sheet;

thereafter subjecting the first annealed cold rolled steel sheet to cold rolling with a reduction rate from 50% to 95% to obtain a cold rolled steel sheet;

thereafter the cold rolled steel sheet is subjected to a second annealing wherein heating for the second annealing starts from room temperature to an annealing temperature range TA2 from 880° C. to 1050° C., with a heating rate HR2 of at least 1° C./s, and annealing at the TA2 temperature for 10 to 5000 seconds;

then cooling the cold rolled steel sheet starting from the TA2 temperature to a temperature T2 from 300° C. to 20° C., with a cooling rate CR1 from 1° C./s to 150° C./s; and then cooling to room temperature to obtain a double cold rolled non-oriented electrical steel sheet.

9. The method as recited in claim 8 wherein the TA1 temperature for annealing is from 950° C. to 1070° C.

10. The method as recited in claim 8 wherein the temperature T1 is from 200° C. to 20° C.

11. The method as recited in claim 8 wherein the cooling rate CR1 is from 3° C./s to 120° C./s.

12. The double cold rolled non-oriented electrical steel sheet as recited in claim 1, wherein the composition consists of the following elements, expressed in percentage by weight:

0.0001% ≤ Carbon ≤ 0.007%

0.15% ≤ Manganese ≤ 0.3%

3.2% ≤ Silicon ≤ 3.8%

0.8% ≤ Aluminum ≤ 1.1%

Phosphorus ≤ 0.15%

0% ≤ Sulfur ≤ 0.006%

0% ≤ Nitrogen ≤ 0.09%

0.01% ≤ Copper ≤ 1% a remainder of the composition being composed of iron and unavoidable impurities caused by processing.

13. The double cold rolled non-oriented electrical steel sheet as recited in claim 1, wherein the percentage of eddy current losses in total iron losses, measured at 1 T and 400 Hz according to IEC 60404-2 standards, is from 25% to less than 30% when calculated in accordance of Bertotti method.

14. The double cold rolled non-oriented electrical steel sheet as recited in claim 12, wherein the composition includes 0.02%≤Copper≤1%.

15. The double cold rolled non-oriented electrical steel sheet as recited in claim 1, wherein the composition includes 0.02%≤Copper≤1%.

* * * * *